United States Patent
Lee et al.

(10) Patent No.: US 12,007,775 B2
(45) Date of Patent: Jun. 11, 2024

(54) SYSTEM FOR INSTALLING FLOOR FINISHING MATERIALS USING AUTONOMOUS DRIVING ROBOT

(71) Applicant: Daegu Gyeongbuk Institute of Science and Technology, Daegu (KR)

(72) Inventors: Seung Yeol Lee, Daegu (KR); Sang Ho Kim, Daegu (KR); Yong Seok Lee, Ansan-si (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 157 days.

(21) Appl. No.: 17/335,383

(22) Filed: Jun. 1, 2021

(65) Prior Publication Data
US 2021/0373565 A1 Dec. 2, 2021

(30) Foreign Application Priority Data

Jun. 2, 2020 (KR) .......... 10-2020-0066683
Oct. 22, 2020 (KR) .......... 10-2020-0137718

(51) Int. Cl.
*G05D 1/00* (2024.01)
*E04F 21/22* (2006.01)

(52) U.S. Cl.
CPC .......... *G05D 1/0219* (2013.01); *E04F 21/22* (2013.01); *G05D 1/0225* (2013.01); *G05D 1/0231* (2013.01); *G05D 1/0276* (2013.01)

(58) Field of Classification Search
CPC .......... G05B 2219/50391; G05B 2219/45082; B65F 2210/14; G05D 1/0219;
(Continued)

(56) References Cited

U.S. PATENT DOCUMENTS

2018/0089616 A1*  3/2018  Jacobus .......... G06K 19/06037
2018/0118476 A1   5/2018  Bastian, II et al.
(Continued)

FOREIGN PATENT DOCUMENTS

JP          2775355       7/1998
JP        2000-242333     9/2000
(Continued)

*Primary Examiner* — Kenneth J Malkowski
*Assistant Examiner* — Carville Albert Hollingsworth, IV
(74) *Attorney, Agent, or Firm* — LEX IP MEISTER, PLLC (57) ABSTRACT

The present disclosure relates to a system for installing a floor finishing material using an autonomous driving robot. According to the present disclosure, there is provided a system for installing a floor finishing material using autonomous driving including: a floor surface cleaning and adhesive application robot that cleans a floor surface and applies adhesive while moving with autonomous driving; a finishing material installation robot that installs the floor finishing material on an upper side of the adhesive surface; a finishing material loading robot that loads the floor finishing material loaded in an installation site, on a pallet; a finishing material transport robot that transports and delivers the loaded floor finishing material to the finishing material installation robot; and a 3D positioning device that sets a position thereof as an origin and recognizes positions of a plurality of active markers installed in a work site.

7 Claims, 6 Drawing Sheets

(58) Field of Classification Search
CPC .. G05D 1/0225; G05D 1/0231; G05D 1/0276; G05D 2201/0202; E04F 21/22
See application file for complete search history.

(56) References Cited

U.S. PATENT DOCUMENTS

| | | | |
|---|---|---|---|
| 2020/0024853 A1* | 1/2020 | Furrer | B25J 9/163 |
| 2020/0031248 A1* | 1/2020 | Kwak | G05D 1/0231 |
| 2020/0198122 A1* | 6/2020 | Newman | B25J 9/1676 |

FOREIGN PATENT DOCUMENTS

| | | |
|---|---|---|
| JP | 2018-123645 | 8/2018 |
| KR | 10-2008-0038865 | 5/2008 |
| KR | 10-2019-0088115 | 7/2019 |

* cited by examiner

SYSTEM FOR INSTALLING FLOOR FINISHING MATERIALS USING AUTONOMOUS DRIVING ROBOT

TECHNICAL FIELD

The present disclosure relates to a system for installing a floor finishing material using an autonomous driving robot, and to a system for installing a floor finishing material using an autonomous driving robot for installing a floor finishing material in a construction site using a plurality of autonomous driving robots.

BACKGROUND ART

Recently, as urban forms change to high density, architectural structures are also becoming taller and larger than those in the past. In addition, construction materials are becoming larger and heavier in order to satisfy diverse needs of residents. In general, construction materials are manufactured and installed with a size and a weight within limits capable of being constructed. However, for the various needs of consumers and construction efficiency, it is inevitable to increase the size of construction materials.

On the other hand, since it is difficult to transport and install the enlarged construction materials (for example, large glass finishing materials) only by manpower, recently, construction robots for transporting and installing the enlarged construction materials are used.

Conventional construction robots are remote-controlled by a worker from a distance, and since the installation of the construction materials depends only on the worker's field of vision, there is a problem that the installation work that requires fine adjustment takes a long time compared to that of the conventional manpower construction.

According to an analysis of causes of accidents by stage of construction work surveyed in Korea for the past two years, it is said that 78% of the total work is caused by outdoor work where humans are heavily influenced by the environment, that is, accidents occurring at the construction site rather than indoor work such as planning or design thereof.

In particular, when looking at the causes of construction stage accidents, it may be said that except for about 2.5% of external environmental causes, human error is related to 95% or more of accidents due to personal negligence, work supervision error, prior consultation error, equipment handling error, inspection error, and the like.

Therefore, it may be said that at least 70% or more of all safety accidents in construction work may be largely resolved through strengthening of a safety system including "mechanization, automation, and robotization of construction sites".

In particular, since the mid-20th century, the industry has developed rapidly, and now, beyond the use of the robot for simple work, even work that is difficult for the human to operate has started to be performed by the robot. Therefore, the need for supervisory control, which is configured of automating instantaneous determination and accumulated knowledge information by human intelligence, has emerged.

Accordingly, there is a need for a system for installing a floor finishing material.

The technology of a background of the present disclosure is disclosed in Korean Patent Unexamined Publication No. 10-2008-0038865 (published on May 7, 2008).

SUMMARY OF INVENTION

Technical Problem

An object of the present disclosure is to provide a system for installing a floor finishing material using an autonomous driving robot for installing a floor finishing material in a construction site using a plurality of autonomous driving robots.

Solution to Problem

According to an embodiment of the present disclosure to achieve the object, there is provided a system for installing a floor finishing material using autonomous driving including: a floor surface cleaning and adhesive application robot that cleans a floor surface on which a floor finishing material is installed and applies adhesive with a constant thickness for fixing the floor finishing material while moving with autonomous driving; a finishing material loading robot that loads the floor finishing material loaded on a pallet; a finishing material transport robot that transports and delivers the loaded floor finishing material from the finishing material loading robot; a finishing material installation robot that receives the floor finishing material from the finishing material transport robot and installs the floor finishing material on an upper side of the adhesive surface applied to the cleaned floor surface with the constant thickness; and a 3D positioning device that sets a position thereof as an origin and recognizes positions and orientation information of a plurality of active markers installed in a work site using a vision-included distance measurement sensor.

The system for installing a floor finishing material may further include: a charging robot that is docked with at least one of the finishing material installation robot, the finishing material transport robot, and the finishing material loading robot to supply electricity.

The floor surface cleaning and adhesive application robot, the finishing material installation robot, the finishing material transport robot, the finishing material loading robot, and the charging robot each may have different identification tags, autonomous driving vision sensors, obstacle recognition vision sensors, and floor recognition sensors.

The autonomous driving vision sensor may recognize the different identification tags installed in the finishing material installation robot, the finishing material transport robot, the finishing material loading robot, and the charging robot, and positions of the active markers. The finishing material installation robot, the finishing material transport robot, the finishing material loading robot, and the charging robot may recognize a surrounding environment through the floor recognition sensors to prevent deviation from a current work environment.

The floor recognition sensor may be installed on a lower side of each of the finishing material installation robot, the finishing material transport robot, the finishing material loading robot, and the charging robot.

The floor recognition sensor may include at least one of vision, lidar, and radar. The finishing material installation robot, the finishing material transport robot, the finishing material loading robot, and the charging robot may recognize the surrounding environment through the floor recognition sensors to prevent deviation from the current work environment.

The obstacle recognition sensor may include at least one of vision, lidar, and radar, and may recognize an obstacle present each of the finishing material installation robot, the finishing material transport robot, the finishing material loading robot, and the charging robot.

The finishing material loading robot or the finishing material installation robot may include a central shaft on a lower side of which a rotation portion is mounted; a horizontal arm configured to extend to left and right by being coupled to the central shaft; a vertical arm that is attached to one side surface of the horizontal arm and operates in a vertical direction to install the floor finishing material on the floor; a balance auxiliary weight that is installed on the other side surface of the horizontal arm to maintain a balance of the horizontal arm; a plurality of floor photographing sensors that are installed to face a floor direction at each corner of a lower surface of the vertical arm to recognize a shape of the floor surface on which the adhesive is applied with a constant thickness; and a work vision sensor that is installed on one side surface of the vertical arm to move and install the floor finishing material.

The finishing material installation robot may recognize the shape of the floor surface, on which the adhesive is applied with the constant thickness, present in an image photographed from the floor photographing sensor and may position the floor finish material such that the corners of the floor finish materials, which are installed with centering on an initial reference coordinate system of a building, are in contact with each other.

The 3D positioning device may set a position thereof as an origin, measure a relative position and orientation information between a plurality of active markers installed in the work site using a vision-included distance measurement sensor, and transmit the relative position and the orientation information for installing the floor finishing material to each of the floor surface cleaning and adhesive application robot, the finishing material installation robot, the finishing material transport robot, the finishing material loading robot, and the charging robot, through an external integrated management module.

Advantageous Effects

As described above, according to the present disclosure, it is possible to perform accurate and uniform work compared to that of a floor finishing material installed by a person, and improve the floor construction quality.

In addition, it is possible to prevent accidents at the construction site and safely install the construction material at an accurate position.

DETAILED DESCRIPTION OF EMBODIMENTS

Hereinafter, embodiments of the present disclosure will be described in detail with reference to the accompanying drawings so that those of ordinary skill in the art may easily carry out the present disclosure. However, the present disclosure may be embodied in several different forms and is not limited to the embodiments described herein. In order to clearly explain the present disclosure in the drawings, portions irrelevant to the description are omitted, and similar reference numerals are attached to similar portions throughout the specification.

Throughout the specification, when a portion "includes" a certain component, it means that other components may be further included, rather than excluding the other components, unless otherwise stated.

Then, with reference to the accompanying drawings, the embodiments of the present disclosure will be described in detail so that those of ordinary skill in the art to which the present disclosure pertains may easily implement them.

Figure 1:
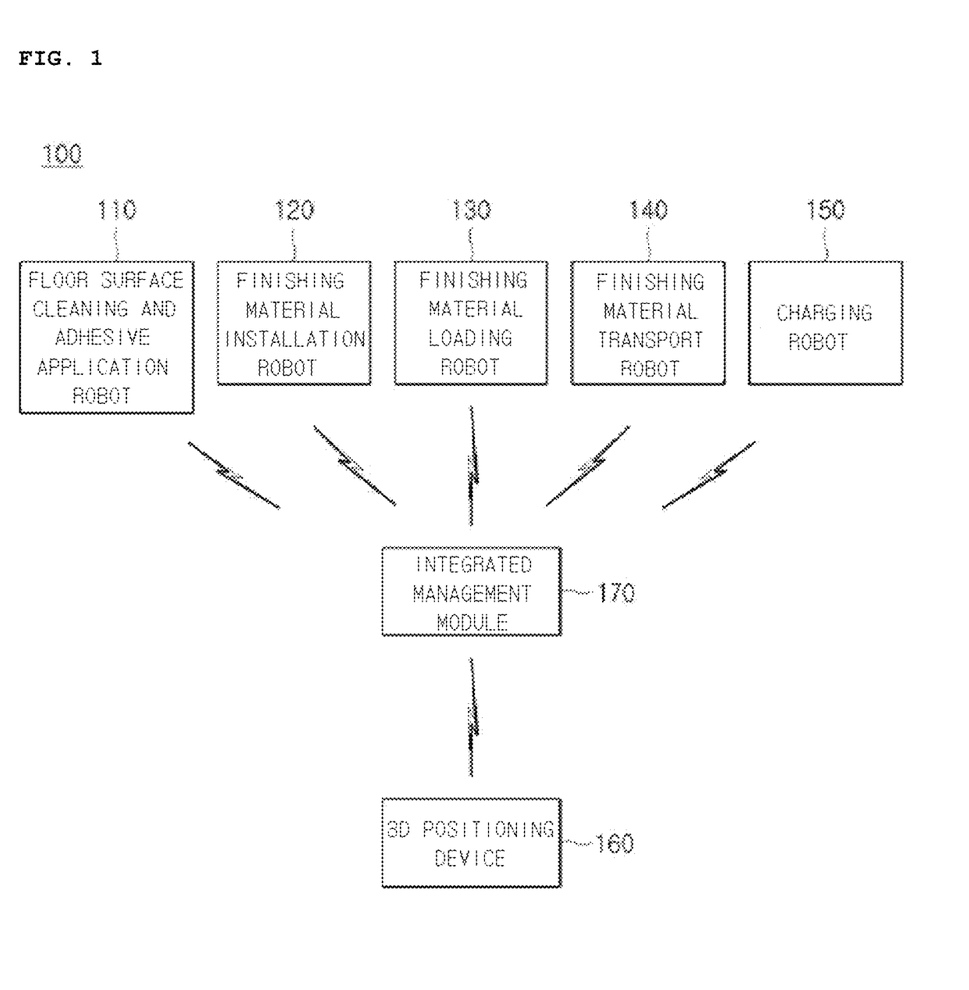
FIG. 1 is a configuration diagram for explaining a configuration of a floor finishing material installation system according to an embodiment of the present disclosure.
Figure 2:
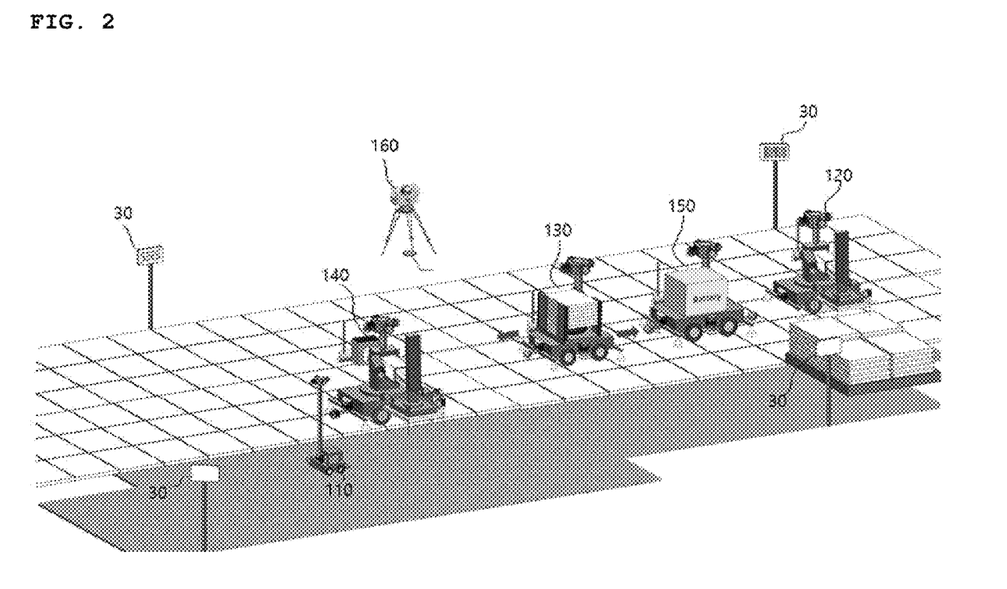
FIG. 2 is an exemplary view of applying the floor finishing material installation system according to an embodiment of the present disclosure.

FIG. 1 is a diagram for explaining a floor finishing material installation system according to an embodiment of the present disclosure and FIG. 2 is an exemplary view applying the floor finishing material installation system according to an embodiment of the present disclosure.

As illustrated in FIGS. 1 and 2, a floor finishing material installation system 100 includes a floor surface cleaning and adhesive application robot 110, a finishing material installation robot 120, a finishing material loading robot 130, and a finishing material transport robot 140, a charging robot 150, a 3D positioning device 160, and an integrated management module 170.

Here, the floor surface cleaning and adhesive application robot 110, the finishing material installation robot 120, the finishing material loading robot 130, the finishing material transport robot 140, and the charging robot 150 are implemented as robots capable of autonomous driving that may find an optimal path to a destination while looking around and detecting obstacles.

First, the floor surface cleaning and adhesive application robot 110 cleans the floor surface on which the finishing material is installed and applies an adhesive with a constant thickness for fixing the floor finishing material while moving with autonomous driving.

Next, the finishing material installation robot 120 installs the floor finishing material on an upper side of the adhesive surface coated on the cleaned floor surface with a constant thickness.

Next, the finishing material loading robot 130 loads the floor finishing material loaded on a pallet to the finishing material transport robot 140.

Next, the finishing material transport robot 140 transports the loaded floor finishing material from the finishing material loading robot to the finishing material installation robot to deliver the floor finishing material.

Next, the charging robot 150 is docked with at least one of the finishing material installation robot, the finishing material transport robot, and the finishing material loading robot to supply electricity.

Next, the 3D positioning device 160 sets a position thereof as an origin, measures a relative position and orientation information between a plurality of active markers installed in the work site using a vision-included distance measurement sensor, and provides the information to each robot.

Next, the integrated management module 170 generates an installation control command of the floor finishing material, and respectively transmits commands for installing the floor finish material to the floor surface cleaning and adhesive application robot 110, the finishing material installation robot 120, the finishing material transport robot 130, the finishing material loading robot 140, and the charging robot 150.

As illustrated in FIG. 2, the floor finishing material installation system 100 uses the integrated management module 170 to control the floor surface cleaning and adhesive application robot 110, the finishing material installation robot 120, the finishing material loading robot 130, the finishing material transport robot 140, the charging robot 150, and the 3D positioning device 160, thereby installing the floor finishing material in the work environment.

Hereinafter, the configuration of the floor finishing material installation system according to the embodiment of the present disclosure will be described in more detail with reference to FIGS. 3 to 8.

Figure 3:
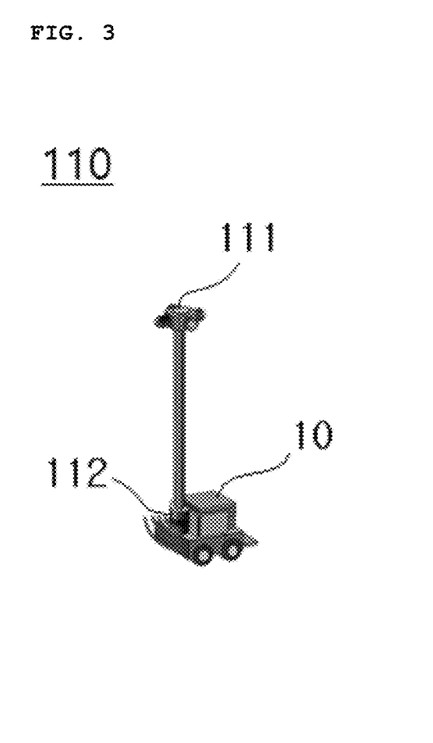
FIG. 3 is a view illustrating a floor surface cleaning and adhesive application robot according to an embodiment of the present disclosure.

FIG. 3 is a view illustrating the floor surface cleaning and adhesive application robot according to an embodiment of the present disclosure.

As illustrated in FIG. 3, the floor surface cleaning and adhesive application robot 110 according to the embodiment of the present disclosure includes an autonomous driving vision sensor 111 and an obstacle recognition vision sensor 112, and cleans the floor surface on which the floor finishing material is to be installed, and apples the adhesive for fixing the finishing material with a constant thickness.

At this time, as illustrated in FIG. 3, the floor surface cleaning and adhesive application robot 110 cleans the floor surface on which the finishing material is to be installed and applies the adhesive for fixing the finishing material with a constant thickness.

Figure 4:
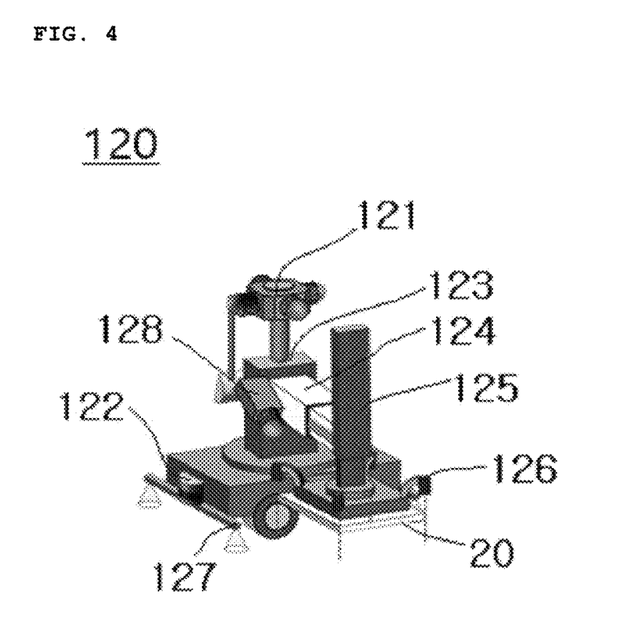
FIG. 4 is a view illustrating a finishing material loading robot according to an embodiment of the present disclosure.

FIG. 4 is a view illustrating the finishing material loading robot according to an embodiment of the present disclosure.

As illustrated in FIG. 4, the finishing material loading robot 120 is attached with a horizontal arm 124 that may extend to the left and right with respect to a central shaft 123 on a lower side of which a rotation portion is mounted, and a vertical arm 125 for installing the floor finishing material on one side surface of the horizontal arm 124.

In addition, the vertical arm 125 of the finishing material loading robot 120 is installed with a plurality of floor photographing sensors 126 to face a floor direction at each corner of a lower surface thereof, and includes a work vision sensor 128 that is installed on one side surface thereof and moves the floor finishing material.

In addition, the floor surface cleaning and adhesive application robot 120 moves with autonomously using the autonomous driving vision sensor 121, the obstacle recognition vision sensor 122, and a floor recognition sensor 127.

Figure 5:
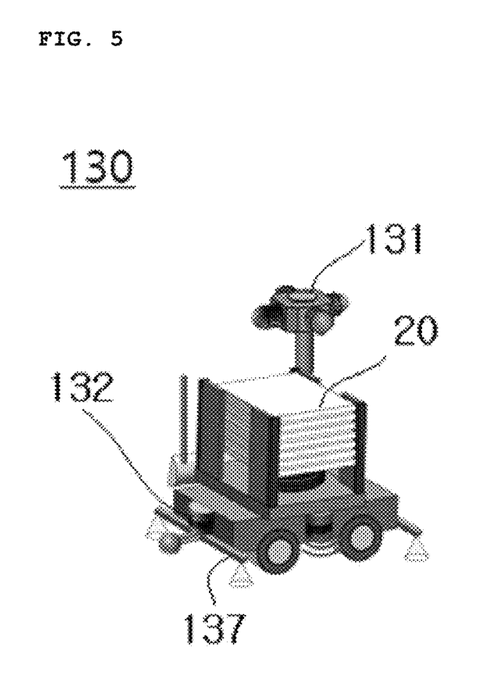
FIG. 5 is a view illustrating a finishing material transport robot according to an embodiment of the present disclosure.

FIG. 5 is a view illustrating the finishing material transport robot according to an embodiment of the present disclosure.

As illustrated in FIG. 5, the finishing material transport robot 130 includes an autonomous driving vision sensor 131, an obstacle recognition vision sensor 132, and a floor recognition sensor 137.

At this time, as illustrated in FIG. 5, the finishing material transport robot 130 transports a loaded floor finishing material 20 from the finishing material loading robot 120 to the position of the finishing material installation robot 150 with autonomous driving.

Figure 6:
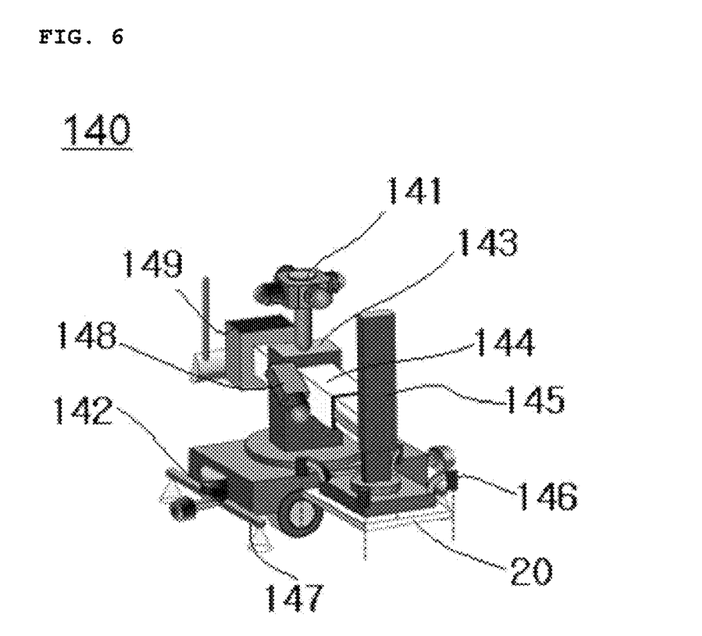
FIG. 6 is a view illustrating a finishing material installation robot according to an embodiment of the present disclosure.

FIG. 6 is a view illustrating the finishing material installation robot according to an embodiment of the present disclosure.

As illustrated in FIG. 6, the finishing material installation robot 140 includes an autonomous driving vision sensor 141, an obstacle recognition vision sensor 142, a central shaft 143, a horizontal arm 144, a vertical arm 145, a floor photographing sensor 146, a floor recognition sensor 147, a work vision sensor 148, and a balance auxiliary weight 149.

At this time, the finishing material installation robot 140 is attached with the horizontal arm 144 that may extend to the left and right with respect to the central shaft 143 on a lower side of which the rotation portion is mounted, the vertical arm 145 for installing the floor finishing material on one side surface of the horizontal arm 144, and the balance auxiliary weight 149 on the other side surface of the horizontal arm 144 to maintain the balance of the horizontal arm 144.

In addition, the vertical arm 144 of the finishing material installation robot 140 is installed with a plurality of floor photographing sensors 146 to face the floor direction at each corner of a lower side thereof, and includes the work vision sensor 148 for moving and installing the floor finishing material.

At this time, the finishing material installation robot 140 recognizes a shape of the floor surface present in the image photographed from the floor photographing sensor 146, on which the adhesive is applied with a constant thickness, and installs the floor finish material such that the corners of the floor finish materials, which are installed with centering on an initial reference coordinate system of a building, are in contact with each other.

Figure 7:
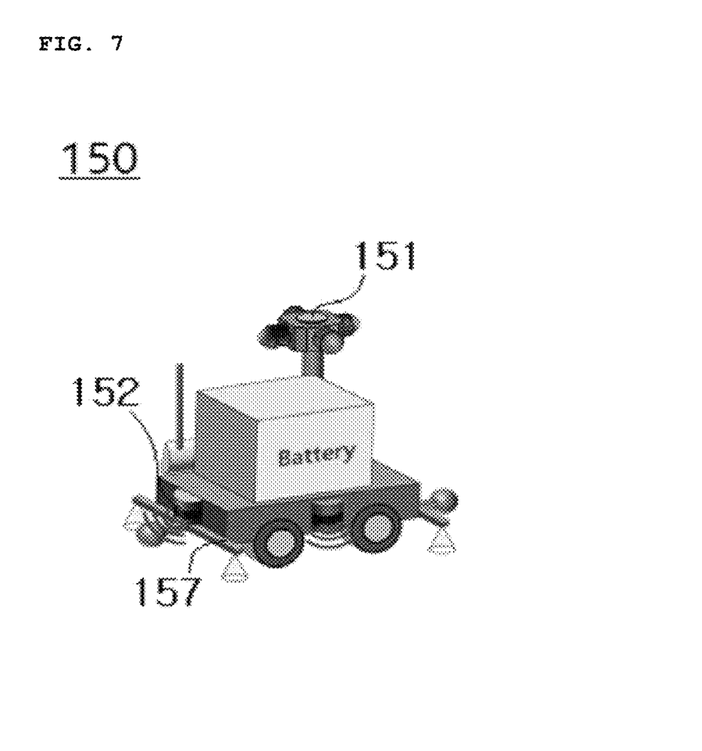
FIG. 7 is a view illustrating a charging robot according to an embodiment of the present disclosure.

FIG. 7 is a view illustrating the charging robot according to an embodiment of the present disclosure.

As illustrated in FIG. 7, the charging robot 150 includes an autonomous driving vision sensor 151, an obstacle recognition vision sensor 152, and a floor recognition sensor 157.

In particular, the charging robot 150 includes a battery to supply electricity to the finishing material loading robot 120, the finishing material transport robot 130, and the finishing material installation robot 140 by being docked therewith.

Here, the autonomous driving vision sensors 111, 121, 131, 141, and 151 use a plurality of active markers 30 installed at any point in the place where the floor finishing material is currently installed and an identification tag (not illustrated) installed on each of the floor surface cleaning and adhesive application robot 110, the finishing material loading robot 120, the finishing materials transport robot 130, the finishing material installation robot 140, and the charging robot 150, to recognize each robot position and orientation information.

In addition, the obstacle recognition vision sensors 112, 122, 132, 142, and 152 are installed on front or rear of each of the floor surface cleaning and adhesive application robot 110, the finishing material loading robot 120, the finishing material transport robot 130, the finishing material installation robot 140, and the charging robot 150 to recognize obstacles around the corresponding robot.

The floor recognition sensors 127, 137, and 147 are installed to face the floor direction on the finishing material loading robot 120, the finishing material transport robot 130, and the finishing material installation robot 140 to recognize the floor environment and prevent deviation from the current work environment.

Figure 8:
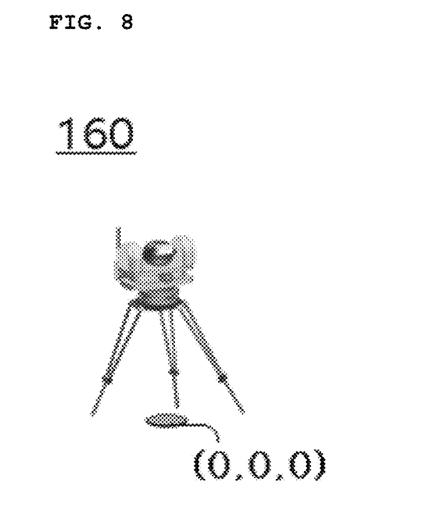
FIG. 8 is a view illustrating a 3D positioning device according to an embodiment of the present disclosure.

FIG. 8 is a view illustrating the 3D positioning device according to an embodiment of the present disclosure.

As illustrated in FIG. 8, the 3D positioning device 160 sets the currently installed position as a three-dimensional origin coordinate (0, 0, 0), that is, a reference coordinate, and measures each of three-dimensional position coordinates and orientation information of a plurality of active markers installed in the work site using the vision-included distance measurement sensor.

In this case, when the position of the 3D positioning device 160 is changed, the positions of the plurality of active markers installed in the work site are also changed.

As described above, according to the embodiments of the present disclosure, it is possible to perform accurate and uniform work compared to that of the floor finishing material installed by a person, and improve the floor construction quality.

In addition, it is possible to prevent an accident at the construction site, and safely install the construction material at an accurate position.

Although the present disclosure has been described with reference to the embodiments illustrated in the drawings which are merely exemplary, those skilled in the art will understand that various modifications and equivalent other embodiments are possible therefrom. Accordingly, the true technical protection scope of the present disclosure should be determined by the technical idea of the appended claims.

The invention claimed is:

1. A system for installing a floor finishing material using autonomous driving comprising:
 a floor surface cleaning and adhesive application robot that cleans a floor surface on which a floor finishing material is installed and applies adhesive with a constant thickness for fixing the finishing material while moving with autonomous driving;
 a finishing material loading robot that loads the floor finishing material loaded on a pallet;
 a finishing material transport robot that transports and delivers the loaded floor finishing material from the finishing material loading robot;
 a finishing material installation robot that receives the floor finishing material from the finishing material transport robot and installs the floor finishing material on an upper side of the adhesive surface applied to the cleaned floor surface with the constant thickness;
 a charging robot that is docked with at least one of the finishing material installation robot, the finishing material transport robot, and the finishing material loading robot to supply electricity; and
 a 3D positioning device that sets a position thereof as an origin and recognizes positions and orientation information of a plurality of active markers installed in a work site using a vision-included distance measurement sensor,
 wherein each of the floor surface cleaning and adhesive application robot, the finishing material installation robot, the finishing material transport robot, the finishing material loading robot, and the charging robot has a different identification tag, an autonomous driving vision sensor, an obstacle recognition vision sensor, a floor recognition sensor and an autonomous driving system,
 wherein the autonomous driving vision sensor recognizes the different identification tags installed in the finishing material installation robot, the finishing material transport robot, the finishing material loading robot, and the charging robot, and positions of the active markers, and
 wherein the finishing material installation robot, the finishing material transport robot, the finishing material loading robot, and the charging robot recognize a surrounding environment through the floor recognition sensors to prevent deviation from a current work environment.

2. The system for installing a floor finishing material according to claim 1, wherein the floor recognition sensor is installed on a lower side of each of the finishing material installation robot, the finishing material transport robot, the finishing material loading robot, and the charging robot.

3. The system for installing a floor finishing material according to claim 2,
 wherein the floor recognition sensor includes at least one of vision, lidar, and radar, and
 wherein the finishing material installation robot, the finishing material transport robot, the finishing material loading robot, and the charging robot recognize the surrounding environment through the floor recognition sensors to prevent deviation from the current work environment.

4. The system for installing a floor finishing material according to claim 2, wherein the obstacle recognition vision sensor includes at least one of vision, lidar, and radar, and the obstacle recognition vision sensor recognizes an obstacle located in front of each of the finishing material installation robot, the finishing material transport robot, the finishing material loading robot, and the charging robot.

5. The system for installing a floor finishing material according to claim 1, wherein the finishing material loading robot or the finishing material installation robot includes
 a central shaft on a lower side of which a rotation portion is mounted;
 a horizontal arm configured to extend to left and right by being coupled to the central shaft;
 a vertical arm that is attached to one side surface of the horizontal arm and operates in a vertical direction to install the floor finishing material on the floor;
 a balance auxiliary weight that is installed on the other side surface of the horizontal arm to maintain a balance of the horizontal arm;
 a plurality of floor photographing sensors that are installed to face a floor direction at each corner of a lower surface of the vertical arm to recognize a shape of the floor surface on which the adhesive is applied with a constant thickness; and
 a work vision sensor that is installed on one side surface of the vertical arm to move and install the floor finishing material.

6. The system for installing a floor finishing material according to claim 5, wherein the finishing material installation robot recognizes the shape of the floor surface, on which the adhesive is applied with the constant thickness, present in an image photographed from the floor photographing sensor and positions the floor finish material such that the corners of the floor finish materials, which are installed with centering on an initial reference coordinate system of a building, are in contact with each other.

7. The system for installing a floor finishing material according to claim 1, wherein the 3D positioning device sets a position thereof as an origin, measures a relative position and orientation information between a plurality of active markers installed in the work site using a vision-included distance measurement sensor, and transmits the relative position and the orientation information for installing the floor finishing material to each of the floor surface cleaning and adhesive application robot, the finishing material installation robot, the finishing material transport robot, the finishing material loading robot, and the charging robot, through an external integrated management module.

* * * * *